(12) United States Patent
Watts

(10) Patent No.: US 7,990,309 B2
(45) Date of Patent: Aug. 2, 2011

(54) CONSTANT FALSE ALARM RATE ADAPTIVE RADAR CONTROL

(75) Inventor: Simon Watts, Surrey (GB)

(73) Assignee: Thales Holdings UK PLC (GB)

( * ) Notice: Subject to any disclaimer, the term of this patent is extended or adjusted under 35 U.S.C. 154(b) by 396 days.

(21) Appl. No.: 12/133,478

(22) Filed: Jun. 5, 2008

(65) Prior Publication Data
US 2009/0315757 A1 Dec. 24, 2009

(30) Foreign Application Priority Data
Jun. 6, 2007 (GB) .................................. 0710848.3

(51) Int. Cl.
*G01S 13/00* (2006.01)
(52) U.S. Cl. ............................................ 342/93; 342/27
(58) Field of Classification Search ...................... 342/93
See application file for complete search history.

(56) References Cited

U.S. PATENT DOCUMENTS
4,213,127 A * 7/1980 Cole ................................. 342/93
4,780,720 A * 10/1988 Watts ............................. 342/91
5,703,592 A * 12/1997 Watts ............................. 342/93

FOREIGN PATENT DOCUMENTS
GB 2297213 7/1996

OTHER PUBLICATIONS

"Electronic Warfare in the Information Age" by D Curtis Schleher (1999) published by Artech House, Inc.
M.M.Finn and R.S.Johnson, "Adaptive detection mode with threshold control as a function of spatially sampled clutter-level estimates", RCA Review, vol. 30 (1968), pp. 414-465.
K D Ward, C J Baker and S Watts, "Maritime Surveillance radar part 1: Radar scattering from the ocean surface" Proc IEE, vol. 137, part F, No. 2, Apr. 1990 pp. 51-62.

* cited by examiner

*Primary Examiner* — Thomas H Tarcza
*Assistant Examiner* — Timothy A Brainard
(74) *Attorney, Agent, or Firm* — Lowe Hauptman Ham & Berner, LLP

(57) ABSTRACT

A method of analyzing return signals of successive range cells in a scene using constant false alarm rate adaptive control comprising, for each successive range cell in turn is disclosed mathematically. The return signal is processed mathematically and averaged over a predetermined number of cells near that cell. A first variable factor and the return signal for that cell, to derive a first result. The first variable is adapted depending upon that first result. A second variable factor is derived in accordance with a predetermined relationship between the first and second factors are mathematically processed. The second factor is mathematically processed. The second averaged return signal and the return signal for the cell, to derive a second result. The second result is used as an indication of the presence of an object of interest in the scene.

18 Claims, 1 Drawing Sheet

CONSTANT FALSE ALARM RATE ADAPTIVE RADAR CONTROL

RELATED APPLICATIONS

The present application is based on, and claims priority from, Great Britain Application Number 0710848.3, filed Jun. 6, 2007, the disclosure of which is hereby incorporated by reference herein in its entirety.

FIELD OF THE INVENTION

This invention relates to the control of false alarms in clutter in the signal processing of radar, and is particularly, although not exclusively, useful for controlling false alarms in sea clutter in the detection of small targets at sea.

BACKGROUND OF THE INVENTION

As described in "Electronic Warfare in the Information Age" by D Curtis Schleher (1999) published by Artech House, Inc., constant false alarm rate (CFAR) processing adjusts a radar detection threshold in the presence of clutter residues. Cell-averaging CFAR is one of the more prominent CFAR techniques and a well-known form of cell-averaging CFAR is disclosed in M. M. Finn and R. S. Johnson, Adaptive detection mode with threshold control as a function of spatially sampled clutter-level estimates, RCA Review, Vol. 30 (1968), pp. 414-465. Clutter returns may vary both spatially and temporally, and in the example of sea clutter this variation may be caused for example by variations in wind and ocean currents. Clutter will generally be a function of the angle of view.

An outline of a known, basic form of CFAR is illustrated in FIG. 1. This adaptive control system for use in radar apparatus receives an input $x_i$ (i=1, 2, ..., N) which is a succession of N samples of radar return signals, representing successive range cells in a scene. Each of these return signals may be optionally the result of "within beam integration" (WBI), whereby samples in each range cell from successive radar pulses are integrated. The control system comprises a range cell-averaging CFAR filter which is used to estimate the local clutter mean level surrounding the cell under test. This mean level estimate $z_i$ (i=1, 2, ..., N) is multiplied 7 by a first variable factor $\alpha$, the threshold multiplier, and is used to set a threshold t against which the range cell under test is compared. The output from this threshold in comparator 8 is either a 0 or a 1 for each successive range cell tested.

In the example shown in FIG. 1, the cell under test 3 is at the centre of a group of M++2G+1 cells. Each cell 1, 2, 3, 4, 5 of the G cells 2, 4 on either side of the cell under test is ignored, whilst the M/2 cells 1, 5 at each end are averaged to produce the mean level estimate $z_i$. This can be written mathematically as:

$$z_i = \frac{1}{M}\left(\sum_{j=-M/2-G}^{j=-G-1} E_{i+j} + \sum_{j=G+1}^{j=M/2+G} E_{i+j}\right)$$

The CFAR configuration which determines M is of course selectable depending upon the specific application.

The appropriate value of the first variable factor $\alpha$ is a complicated function of the clutter amplitude statistics, the clutter spatial characteristics and the configuration of the cell averaging filter. In general, the appropriate value of $\alpha$ is a continuously varying function of radar look direction and the range and depression angle relative to the radar of the cell under test. The CFAR control system measures the false alarm rate at the output OUT of the detection threshold and continuously adapts a in a closed loop control system as shown, using the adaptive control circuitry 6, to achieve the desired false alarm rate under changing conditions.

Measurement of false alarm rate requires an adequate number of independent samples of the process to be taken. However, the clutter characteristics and hence the appropriate value of $\alpha$ will change with range and look direction. Samples taken from too large an area would not allow local control of $\alpha$, whilst samples taken from too small an area would give poor estimates of the false alarm rate. In practice, the CFAR system controls a using returns from a series of annuli centred on zero range. The range extent of each annulus is such that an appropriate false alarm rate can be estimated using a single range spoke from the radar. This allows a to be updated at successive pulse intervals as the radar scans.

In order to accommodate typical variations of conditions with radar range, it is desirable to have as many CFAR annuli as possible and as discussed above this restricts the false alarm rate that can be measured accurately.

SUMMARY OF THE INVENTION

The purpose of the present invention is to overcome this problem.

Accordingly, the invention provides a method of analysing radar return signals of successive range cells in a scene using constant false alarm rate adaptive control comprising, for each successive range cell under test in turn: processing mathematically the return signal averaged over a predetermined number of cells near the cell under test, a first variable factor and the return signal for the cell under test, to derive a first result; adapting the first variable factor depending upon the summation of first results over a group of range cells; deriving a second variable factor in accordance with a predetermined relationship between the first and second factors; processing mathematically the second factor, the said averaged return signal and the return signal for the cell under test, to derive a second result; and using the second result as an indication of the presence of an object of interest in the scene.

The invention also provides an adaptive control system for use in radar apparatus, comprising an input for receiving radar return signals of successive range cells in a scene, and a processor arranged, for each successive range cell in turn, to: process mathematically the return signal averaged over a predetermined number of cells near that cell, a first variable factor and the return signal for that cell, to derive a first result; to adapt the first variable factor depending upon the summation of first results over a group of range cells; to derive a second variable factor in accordance with a predetermined relationship between the first and second factors; to process mathematically the second factor, the said averaged return signal and the return signal for the said cell, to derive a second result; and to use the second result as an indication of the presence of an object of interest in the scene.

Further, the invention provides a computer program for use in analysing radar return signals of successive range cells in a scene using constant false alarm rate adaptive control, which, when executed in a processor, causes it to carry out the process, for each successive range cell under test in turn, of processing mathematically the return signal averaged over a predetermined number of cells near the cell under test, a first variable factor and the return signal for the cell under test, to derive a first result; adapting the first variable factor depending on the summation of first results over a group of range cells; deriving a second variable factor in accordance with a predetermined relationship between the first and second factors; processing mathematically the second factor, the said averaged return signal and the return signal for the cell under test, to derive a second result; and using the second result as an indication of the presence of an object of interest in the scene.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

DETAILED DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
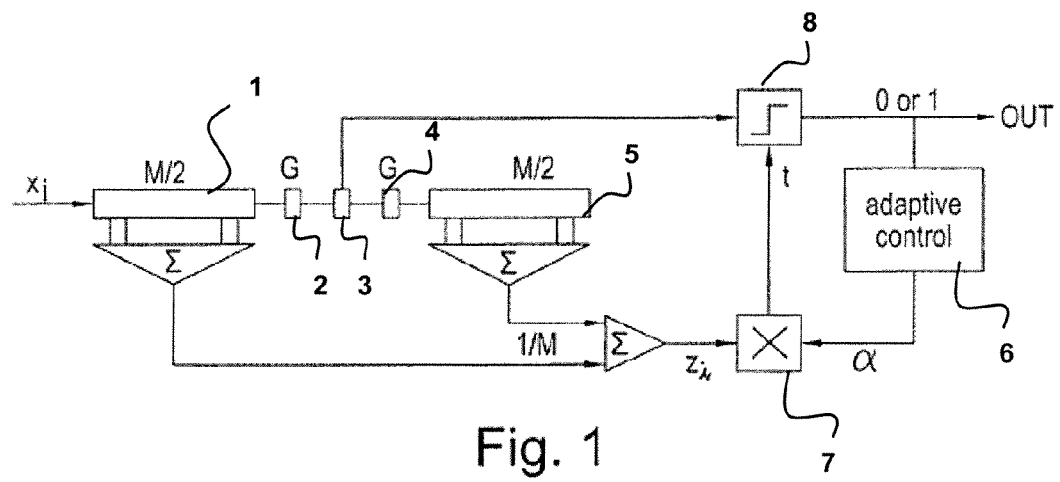
FIG. 1 is a diagram of a prior art CFAR.
Figure 2:
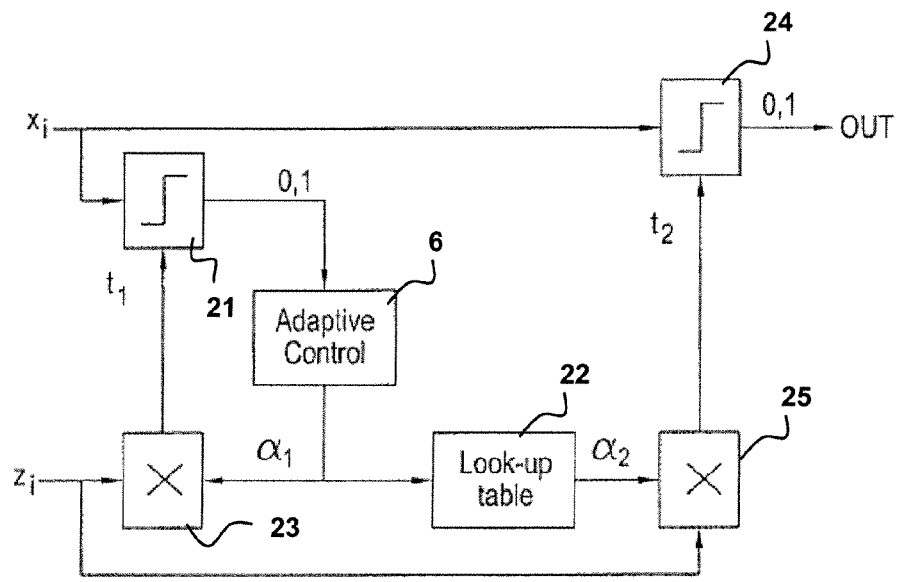
FIG. 2 is a diagram of an adaptive control system according to the present invention.

Elements of the adaptive control system of FIG. 2 that correspond to those of FIG. 1 are given the same reference numerals.

The CFAR control system of FIG. 2 uses a two threshold detection process. The first threshold 21, 23 is controlled by a first variable factor $\alpha_1$ and this is set to give a probability of false alarms of preferably about $10^{-2}$. This can be measured reasonably accurately with a sample size of the order of 1000 independent samples. This in turn means that typically there can be between 8 and 24 CFAR annuli over the instrumented range of the radar apparatus. A second threshold 24, 25 is controlled by a second variable factor $\alpha_2$ and this provides a false alarm rate appropriate to the subsequent radar processing and display. This false alarm rate is generally too low to be measured directly; for example the probability could be about $10^{-6}$. The second variable factor $\alpha_2$ is derived, in this embodiment, from a look-up table dependent on the radar parameters, i.e. the value of M in the cell averaging, and on the current value of the first variable factor $\alpha_1$. Thus the CFAR control system shown in FIG. 2 is configurable to suit the cell averaging process and in particular the number M as shown in FIG. 1; and is also dependent on the number of pulses integrated by the within beam integration (WBI) process in the radar.

For each radar spoke and each CFAR annulus, the false alarm probability $P_{fa}$ following the first threshold 21 is estimated by counting alarms. If too many alarms are counted, the first variable factor $\alpha_1$ is incremented in value by the adaptive control circuitry 6, whilst if too few alarms are counted, it is decremented in this circuitry. $\alpha_1$ is multiplied 23 by each incoming mean level estimate $z_i$ to produce a value $t_1$ which is compared with the return signals $x_i$ for the cell under test in a comparator 21, the result of which is 0 or 1 and is fed to the adaptive control circuitry 6.

The size of the increments and decrements applied by the adaptive control circuitry will determine the speed of response to changing conditions and the accuracy to which the false alarm rate is controlled. In general, the sizes of increments and decrements will be a function of the number of alarms counted in a given spoke.

The false alarm rate controlled by $\alpha_1$ may be the same for each annulus. The final radar false alarm rate is set by the second variable factor $\alpha_2$. $\alpha_2$ is derived, in this embodiment, by a look-up table 22 stored in computer memory and referenced by the value of $\alpha_1$, the desired false alarm rate controlled by $\alpha_1$ and by the required display probability $P_{fa}$ for that annulus, as controlled by $\alpha_2$. The required display probability $P_{fa}$ will be determined for each annulus by the display alarm rate set by an operator, by the range and size of the given annulus, and by any scan-to-scan integration undertaken. Separate look-up tables are required for all relevant combinations of data, i.e. for different settings of the number of pulses integrated by the WBI; the cell averaging CFAR configuration which determines the number M; and the value of $P_{fa}$ controlled by the first variable factor $\alpha_1$.

The look-up table 22 is based on the assumption that the clutter amplitude will be K-distributed (see for example K D Ward, C J Baker and S Watts, "Maritime Surveillance radar part 1: Radar scattering from the ocean surface" Proc IEE, Vol 137, part F, No. 2, April 1990 pp 51-62). If the clutter-to-noise ratio can be estimated, this can also be used as an input to the look-up table. This principle can be applied to most other cases where the class of distributions is known from prior experience, i.e., empirically, but an additional parameter must be estimated from the data, provided there is a one-to-one mapping between the threshold level $\alpha_1$ and the extra parameter, and that this can be estimated accurately enough from $\alpha_1$ to control the false alarm rate to the required accuracy. The principle could also be extended to estimating additional parameters by employing further closed loop systems to estimate the threshold at other false alarm rates, subject to false alarm rates being high enough for data to be obtained quickly enough and to the function the parameters of which are being estimated being sufficiently well-controlled.

The basic format of the look-up table of the system of FIG. 2 is shown in Table 1 below. The value of $\alpha_1$ achieved on each spoke is used to select the appropriate column in the table. The value of $\alpha_2$ is read from the row corresponding to the required probability $P_{fa}$ at the second threshold.

The resolution of $\alpha_1$ in the look-up table 22 should match the discrete values achievable and so will be spaced by the minimum increment or decrement value which is used to control $\alpha_1$. The resolution of $\alpha_2$ should be adequate for the desired accuracy for the probability $P_{fa}$. Alternatively, values of $\alpha_2$ could be obtained for intermediate values of $\alpha_1$ and $P_{fa}$ by interpolating between values in the table.

TABLE 1

| | $\alpha_2$ (dB) | | | | |
|---|---|---|---|---|---|
| n | $\alpha_1$ = 2 dB | $\alpha_1$ = 2.1 dB | $\alpha_1$ = 2.2 dB | $\alpha_1$ = 2.3 dB | $\alpha_1$ = 2.4 dB |
| 4.0 | 3.08 | 3.24 | 3.40 | 3.55 | 3.71 |
| 4.1 | 3.12 | 3.28 | 3.44 | 3.60 | 3.76 |
| 4.2 | 3.16 | 3.22 | 3.48 | 3.65 | 3.81 |
| 4.3 | 3.2 | 3.36 | 3.53 | 3.69 | 3.86 |
| 4.4 | 3.24 | 3.41 | 3.57 | 3.74 | 3.90 |
| 4.5 | 3.28 | 3.45 | 3.62 | 3.78 | 3.95 |

In this example of Table 1, $n = -\log_{10} P_{fa}$.

Typically, it will be necessary to control the false alarm rate within a factor of 2.

In practice, many tables will be required to cover the full range of values of requirements for a radar with multiple operating modes.

The range of variation of $\alpha_2$ over the radar display (that is the radar range and azimuth for a standard plan-position indicator, PPI, display) may easily be of the order of 5 dB to 10 dB. Provision may also be included for the operator to add a small global offset, with the control having a maximum range of perhaps ±1 dB, to allow for cases where their clutter does not quite match the model.

By dynamically estimating the fitting parameter for the clutter model, this approach in accordance with the present invention combines the best of two previous approaches: model-based, and counting actual false alarms. The previous model-based CFAR system modelled the behaviour of clutter from previous data gathering, allowing threshold multipliers to set the desired false alarm rate by direct calculation. Other CFAR systems relied entirely on counting the actual false alarms, which was of course very slow. The model-based system also was easily upset when the clutter did not behave exactly as expected and was therefore unsuitable for use in sea clutter which is very variable in its statistics.

Thus the present invention solves the problem of rapid adaptation of the threshold multiplier $\alpha$ of FIG. 1 to the changing clutter conditions. The low false alarm rates required at the final threshold are very difficult to measure and in order to achieve a rapid response, a low threshold is controlled and the resulting adapting threshold multiplier is used to predict the value required at the final higher threshold.

It is not necessary to use look-up tables, and other ways of storing and using predetermined relationships between the first and second variable factors could be used. For example an algorithm could be stored in a computer program in order to derive the second variable factor $\alpha_2$ from the first $\alpha_1$.

It will be appreciated also that different cell averaging techniques from those shown in FIG. 1 could be used in embodiments of the invention corresponding to the circuitry of FIG. 2. These variations need not be described here, as they are well known radar techniques.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of analysing radar return signals of successive range cells in a scene using constant false alarm rate adaptive control comprising, for each successive range cell under test in turn, an adaptive control circuit,
processing a radar return signal from an object of interest averaged over a predetermined number of cells near the cell under test, a first variable factor and the return signal for the cell under test, to derive a first result; adapting the first variable factor depending upon a summation of first results over a group of range cells; deriving a second variable factor in accordance with a predetermined relationship between the first factor and second factors; processing the second factor, the said averaged return signal and the return signal for the cell under test, to derive a second result; and using the second result as an indication of the presence of the object of interest in the scene.

2. The method according to claim 1, in which the processing of the first variable factor comprises multiplying the first variable factor by the averaged return signal and comparing the result with the return signal for the cell under test.

3. The method according to claim 2, wherein the first result is 0 or 1 depending upon the multiplication result being greater or less than the return signal for the said cell, and the first variable is incremented or decremented accordingly.

4. The method according to claim 2, in which the processing of the second variable factor comprises multiplying the second variable factor by the averaged return signal and comparing the result with the return signal for the cell under test.

5. The method according to claim 1, in which the processing of the second variable factor comprises multiplying the second variable factor by the averaged return signal and comparing the result with the return signal for the cell under test.

6. The method according to claim 5, in which the second result is 0 or 1 depending upon the multiplication result being greater or less than the return signal for the said cell.

7. The method according to claim 1, comprising deriving the second variable factor by using a stored look-up table containing a concordance between values of the variable factors.

8. A method of producing radar images of a scene comprising scanning the scene to generate sequences of radar return signals in range cells corresponding to annuli in the scene, repetitively using the method of claim 1 to determine whether each cell contains a target, and displaying targets on a visual display.

9. An adaptive control system for use in radar apparatus, comprising an input for receiving radar return signals of successive range cells in a scene, and a processor arranged, for each successive range cell in turn, to:
process the return signal averaged over a predetermined number of cells near the said cell, a first variable factor and the return signal for the said cell, to derive a first result; to adapt the first variable factor depending upon that first result; to derive a second variable factor in accordance with a predetermined relationship between the first factor and second factors; to process the second factor, the said averaged return signal and the return signal for the said cell, to derive a second result; and to use the second result as an indication of the presence of an object of interest in the scene.

10. The adaptive control system according to claim 9, in which the processing of the first variable factor comprises multiplying the first variable factor by the averaged return signal and comparing the result with the return signal for the said cell.

11. The adaptive control system according to claim 10, wherein the first result is 0 or 1 depending upon the multiplication result being greater or less than the return signal for the said cell, and the first variable is incremented or decremented accordingly.

12. The adaptive control system according to claim 9, in which the mathematical processing of the second variable factor comprises multiplying the second variable factor by the averaged return signal and comparing the result with the return signal for the said cell.

13. The adaptive control system according to claim 12, in which the second result is 0 or 1 depending upon the multiplication result being greater or less than the return signal for the said cell.

14. The adaptive control system according to claim 9, comprising deriving the second variable factor by using a stored look-up table containing a concordance between values of the variable factors.

15. The adaptive control system according to claim 9, in which the said predetermined relationship between the first factor and second factors has a predetermined dependence upon the predetermined number of cells near the said cell which are averaged, and the adaptive control system responds to an input indicative of that predetermined number of averaged range cells.

16. Radar apparatus comprising an antenna arranged to produce radar return signals of successive range cells in a scene, and an adaptive control system according to claim 9 arranged to receive the radar return signals as an input.

17. Radar apparatus according to claim 16 comprising means for performing within beam integration of radar return signals, and supplying the integrated signals as the said radar return signals of successive range cells in a scene.

18. A radar apparatus comprising a computer program for use in analysing radar return signals of successive range cells in a scene using constant false alarm rate adaptive control, the computer program when executed in a processor, causes the processor to carry out a process, for each successive range cell under test in turn, of processing the return signal averaged over a predetermined number of cells near the cell under test, a first variable factor and the return signal for the cell under test, to derive a first result; adapting the first variable factor depending on that first result; deriving a second variable factor in accordance with a predetermined relationship between the first factor and second factors; processing the second factor, the said averaged return signal and the return signal for the cell under test, to derive a second result; and using the second result as an indication of the presence of an object of interest in the scene.

* * * * *